United States Patent [19]

Kaaden

[11] Patent Number: 5,046,939
[45] Date of Patent: Sep. 10, 1991

[54] INJECTION MOLDING MACHINE HAVING AN INJECTION MOLD FOR PRODUCING PLASTIC PARTS FROM CHEMICAL MATERIALS

[75] Inventor: Hans-Heinrich Kaaden, Bad Aibling, Fed. Rep. of Germany

[73] Assignee: Stübbe GmbH, Starnberg, Fed. Rep. of Germany

[21] Appl. No.: 446,464

[22] Filed: Dec. 4, 1989

[30] Foreign Application Priority Data

Apr. 4, 1987 [DE] Fed. Rep. of Germany ....... 3711389
Apr. 5, 1988 [WO] PCT Int'l Appl. ............ PCT/DE88/00217
Apr. 5, 1988 [WO] PCT Int'l Appl. ............ PCT/DE88/00218

[51] Int. Cl.⁵ .................. B29C 45/03; B29C 45/26
[52] U.S. Cl. .................................. 425/195; 249/120; 425/556; 425/567; 425/572
[58] Field of Search ............... 425/411, 572, 567, 183, 425/193, 195, 575, 588, 556, 450.1, 554, 556, 436 R, 437, 438, 444; 249/119, 120

[56] References Cited

U.S. PATENT DOCUMENTS

| | | | |
|---|---|---|---|
| 479,212 | 7/1892 | Fuchs | 249/119 |
| 2,298,044 | 10/1942 | Dinzl | 425/572 |
| 2,668,985 | 2/1954 | Babbitt | 425/567 |
| 3,557,408 | 1/1971 | Fischer et al. | 425/128 |
| 3,663,145 | 5/1972 | Teraoka | 425/588 |
| 3,871,611 | 3/1975 | Taketa | 249/102 |
| 4,025,268 | 5/1977 | Taylor | 425/411 |
| 4,128,376 | 12/1978 | Albertazzi | 425/411 |
| 4,240,780 | 12/1980 | Carey | 425/411 |
| 4,243,367 | 1/1981 | Renoux | 425/411 |
| 4,416,604 | 11/1983 | Bender et al. | 425/572 |
| 4,518,338 | 5/1985 | Hehl | 425/575 |
| 4,555,228 | 11/1985 | Nishiike et al. | 425/575 |
| 4,697,784 | 10/1987 | Schmid | 425/572 |
| 4,753,592 | 6/1988 | Kaaden | 425/547 |
| 4,793,796 | 12/1988 | Kaaden | 425/572 |
| 4,867,938 | 9/1989 | Schad et al. | 425/588 |

FOREIGN PATENT DOCUMENTS

| | | | |
|---|---|---|---|
| 236269 | 10/1964 | Austria | 425/411 |
| 2749549 | 5/1979 | Fed. Rep. of Germany | 425/556 |
| 3428780 | 1/1985 | Fed. Rep. of Germany . | |
| 660049 | 7/1929 | France . | |
| 2152932 | 9/1972 | France . | |
| 0148139 | 11/1980 | Japan | 425/567 |
| 56-129152 | 9/1981 | Japan . | |
| 0167149 | 10/1983 | Japan | 425/411 |
| 2033616 | 2/1987 | Japan | 425/575 |
| 8601146 | 2/1986 | World Int. Prop. O. . | |

Primary Examiner—Willard E. Hoag
Attorney, Agent, or Firm—Herbert L. Lerner; Laurence A. Greenberg

[57] ABSTRACT

An injection molding machine for producing plastic parts from chemical materials includes a mold mounting plate divided into two parts in a direction transverse to a closing direction of the parts. A quick-acting clamping device holds the parts together with a closing force. At least one of the parts is laterally movable on guide spars after releasing the clamping device. A melt guide system is disposed between the parts. Adapters are disposed in a cassette holder opening formed in at least one of the parts. Mold halves in the form of cassette plates have surfaces facing the melt guide system. At least one of the cassette plates is disposed on the adapters in the opening formed in the at least one part. There is a device disposed on the surface of the at least one cassette plate facing the melt guide system for transferring the closing force.

12 Claims, 2 Drawing Sheets

5,046,939

INJECTION MOLDING MACHINE HAVING AN INJECTION MOLD FOR PRODUCING PLASTIC PARTS FROM CHEMICAL MATERIALS

CROSS-REFERENCE TO RELATED APPLICATIONS

This is a continuation of PCT Applications PCT/DE 88/00217 and PCT/DE 88/00218, filed Apr. 5, 1988 both now abandoned.

BACKGROUND OF THE INVENTION

1. Field of the Invention

The invention relates to an injection molding machine having an injection mold for producing plastic parts from chemical materials, including a mold mounting plate which is split transversely to a closing direction into two parts that are held together by a quick-acting clamping device, after the release of the clamping device, one or both of the parts are laterally movable on guide spars, each half of a mold is secured on one or both parts of the mold mounting plate, and a melt guide system is disposed between the two parts of the mold mounting plate.

2. Description of the Related Art

In known injection molding machines (such as in German Patent DE-PS 34 28 780), the mold halves are disposed securely on both sides on the mold mounting plate, which is transversely split. In such a case, the closing pressure is exerted directly upon the mold mounting plate. In the melt guide system of that structure, the melt is guided through one part of the split mounting plate and through one half of the mold to the mold cavity.

It is accordingly an object of the invention to provide an injection molding machine having an injection mold for producing plastic parts from chemical materials, which overcomes the hereinafore-mentioned disadvantages of the heretofore-known devices of this general type, which shortens the flow route from the melt guide system to the mold cavity, and which provides an injection mold constructed in such a way that the closing pressure acts directly on the end plates of the closing system through the molds, rather than through the mold mounting plate in the middle.

SUMMARY OF THE INVENTION

With the foregoing and other objects in view there is provided, in accordance with the invention, an injection molding machine having an injection mold for producing plastic parts from chemical materials, comprising a mold mounting plate divided into two parts in a direction transverse to a closing direction of the parts, a quick-acting clamping device holding the parts together with a closing force, guide spars on which at least one of the parts is laterally movable after releasing the clamping device, a melt guide system disposed between the parts, adapters disposed in a cassette holder opening formed in at least one of the parts, mold halves in the form of cassette plates having surfaces facing the melt guide system, at least one of the cassette plates being disposed on the adapters in the opening formed in the at least one part, and means disposed on the surface of the at least one cassette plate facing the melt guide system for transferring the closing force.

In accordance with another feature of the invention, the opening is formed in the middle of the at least one part.

In accordance with a further feature of the invention, the at least one part has a frame disposed outside and defined by the opening.

In accordance with an added feature of the invention, the opening defines end surfaces of the at least one part, and the adapters are disposed on the end surfaces.

In accordance with an additional feature of the invention, the adapters are disposed all the way around the opening.

In accordance with yet another feature of the invention, the means disposed on the surface of the at least one cassette plate facing the melt guide system for transferring the closing force, are in the form of pressure pads.

In accordance with yet a further feature of the invention, the cassette plates are disposed in the openings formed in both of the parts, and the pressure pads disposed on the cassette plates in the openings face one another and have end surfaces resting on one another.

In accordance with yet an added feature of the invention, there is provided another melt guide system, each of the melt guide systems being disposed securely on a respective one of the cassette plates.

In accordance with yet an additional feature of the invention, the melt guide system is disposed between the pressure pads.

In accordance with again another feature of the invention, there are provided mold nozzles disposed in the cassette plate.

In accordance with again an added feature of the invention, there are provided directly driven individual ejectors disposed between the pressure pads on the surface of at least one of the cassette plates facing toward the melt guide system.

In accordance with a concomitant feature of the invention, there is provided a contour plate being attached to the at least one cassette plate and forming a mold half with the at least one cassette plate.

With the structure according to the invention, the mold half is brought closer to the melt guide system by the width of one part of the split mounting plate, which shortens the flow path of the melt from the melt guide system to the mold cavity. A hollow space in which the particular melt guide system is disposed is also created between the cassette plate and the pressure pads. The closing pressure no longer acts upon the middle of the mold mounting plate. Instead, it acts on the pressure pads facing the cassette plates and therefore directly through the molds to the end plates of the closing system. It becomes possible to place directly driven single or individual ejectors in the hollow space and to secure them on the cassette plate.

Other features which are considered as characteristic for the invention are set forth in the appended claims.

Although the invention is illustrated and described herein as embodied in an injection molding machine having an injection mold for producing plastic parts from chemical materials, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 2:
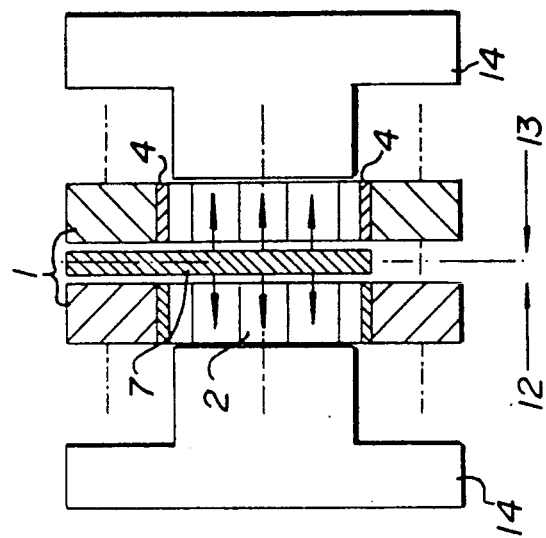
FIG. 2 is a longitudinal-sectional view of a split mounting plate, with one opening in each of the two parts.
Figure 1:
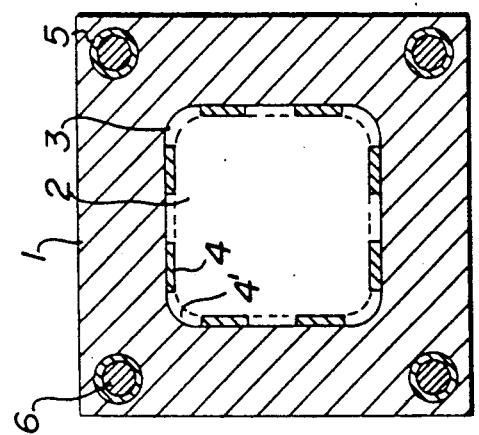
FIG. 1 is a diagrammatic, cross-sectional view of a split mold mounting plate.
Figure 3:
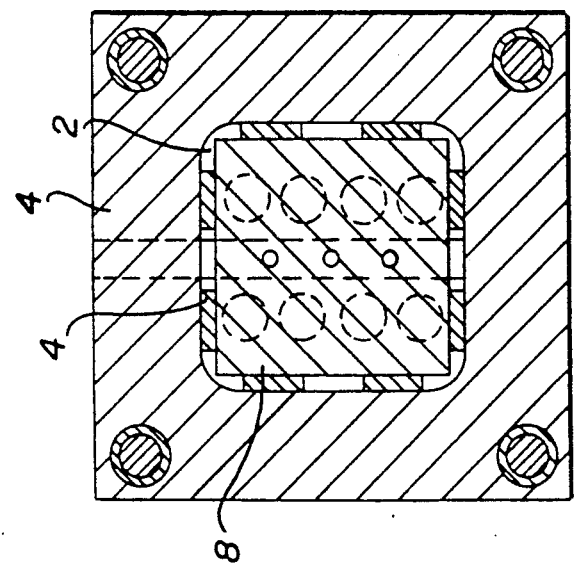
FIG. 3 is a cross-sectional view of a split mounting plate having a cassette plate introduced into one opening.

Referring now to the figures of the drawing in detail and first, particularly, to FIG. 1 thereof, it is seen that each part of a split mold mounting plate 1 has an opening 2 which is formed as a cassette holder, for receiving one mold half. The two parts are moved together in respective clamping directions 12, 13 and held together by a diagrammatically illustrated quick-acting clamping device 14. The mold mounting plate 1 is supported and guided in half-shell bearings 5, each being disposed on one of four guide spars 6 for laterally guiding the parts. After the release of the quick-acting clamping device, it is possible to laterally move the parts of the mold mounting plate 1, which provides access to a melt guide system 7 disposed between the parts. Mutually spaced apart adapters 4 are disposed on end surfaces 3 of the parts of mold mounting plate 1 at the opening 2. The adapters may go all around the openings as shown at 4'. The adapters 4 serve to precisely and centrally position mold halves, which are formed as cassette plates 8, as seen in FIGS. 3 and 4.

A cassette plate 8 for holding plural modular molds is introduced into an opening 2 which is formed in the mold mounting plate 1 that is split transversely to the closing directions 12, 13, so that the plate rests the adapters 4. As a result, precise positioning is attained. The cassette plate 8 is secured to the mold mounting plate I. Several pressure pads 9 for transferring the closing force are vertically spaced apart from each other on the surface of each cassette plate 8 as seen in FIG. 4, and are oriented toward the melt guide system 7. The pressure pads 9 of the two parts of the split mounting plate 1 are disposed in such a way as to face one another, with their end surfaces resting on one another. It may be seen that the pressure pads 9 are in front of the melt guide system 7 toward the right in FIG. 4 and that the pressure pads 9 are behind the melt guide system 7 toward the left in FIG. 4. The depth of the pressure pads 9 is selected in such a way that the hollow space created between the cassette plates 8 can serve to receive both the melt guide system 7 and directly driven individual ejectors 11.

Figure 4:
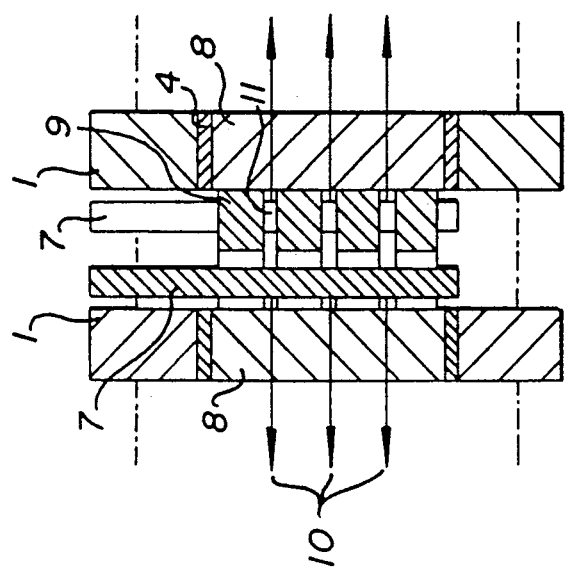
FIG. 4 is a longitudinal-sectional view of a middle split mold mounting plate, with one cassette plate introduced into each of the openings.

As can be seen in FIG. 4, a separate melt guide system is disposed securely on each cassette plate 8. The directly driven individual ejectors 11 are likewise disposed on the surface of the cassette plate 8 oriented toward the melt guide system 7, between the pressure pads 9.

Mold nozzles 10 are disposed in the cassette plates 8. One mold half may be formed by the cassette plate 8 and a contour plate which is joined to the cassette plate 8, may form the die half per se.

What is claimed is:

1. Injection molding machine for producing plastic parts from chemical materials, comprising a mold mounting plate divided into two parts in a direction transverse to a closing direction of said parts, a quick-acting clamping device holding said parts together with a closing force, guide spars on which at least one of said parts is laterally movable after releasing said clamping device, a melt guide system disposed between said parts, adapters disposed in a cassette holder opening formed in at least one of said parts, mold halves in the form of cassette plates having surfaces facing said melt guide system, at least one of said cassette plates being disposed on said adapters in said opening formed in said at least one part, and means disposed on said surface of said at least one cassette plate facing said melt guide system for transferring the closing force.

2. Injection molding machine according to claim 1, wherein said opening is formed in the middle of said at least one part.

3. Injection molding machine according to claim 1, wherein said at least one part has a frame disposed outside and defined by said opening.

4. Injection molding machine according to claim 1, including another melt guide system, each of said melt guide systems being disposed on a respective one of said cassette plates.

5. Injection molding machine according to claim 1, including mold nozzles disposed in said cassette plate.

6. Injection molding machine according to claim 1, including a contour plate being attached to said at least one cassette plate and forming a mold half with said at least one cassette plate.

7. Injection molding machine according to claim 1, wherein said opening defines end surfaces of said at least one part, and said adapters are disposed on said end surfaces.

8. Injection molding machine according to claim 7, wherein said adapters are disposed all the way around said opening.

9. Injection molding machine according to claim 1, wherein said means disposed on said surface of said at least one cassette plate facing said melt guide system for transferring the closing force, are in the form of pressure pads.

10. Injection molding machine according to claim 9, wherein said cassette plates are disposed in said openings formed in both of said parts, and said pressure pads disposed on said cassette plates in said openings face one another and have end surfaces resting on one another.

11. Injection molding machine according to claim 10, wherein said melt guide system is disposed between said pressure pads.

12. Injection molding machine according to claim 9, including directly driven individual ejectors disposed between said pressure pads on said surface of at least one of said cassette plates facing toward said melt guide system.

* * * * *